United States Patent [19]

Fuminier

[11] Patent Number: 4,549,678
[45] Date of Patent: Oct. 29, 1985

[54] METHOD AND APPARATUS FOR SEPARATING A CUT TUBE END

[75] Inventor: Claude B. Fuminier, Pont-A-Mousson, France

[73] Assignee: Pont-A-Mousson S.A., Nancy, France

[21] Appl. No.: 570,311

[22] Filed: Jan. 13, 1984

[30] Foreign Application Priority Data

Jan. 31, 1983 [FR] France .................................. 83 01462

[51] Int. Cl.⁴ ............................................. B26F 3/00
[52] U.S. Cl. ............................................ 225/2; 82/47; 225/95; 225/96.5
[58] Field of Search ....................... 225/2, 95, 103, 96, 225/96.5; 82/47, 46, 101; 30/94, 102

[56] References Cited

U.S. PATENT DOCUMENTS 4,126,064 11/1978 Tarrant ................................ 82/47 X
4,302,958 12/1981 Andriessen et al. ................. 82/47 X

FOREIGN PATENT DOCUMENTS 590092 2/1978 U.S.S.R. ................................ 225/95

Primary Examiner—Frank T. Yost
Attorney, Agent, or Firm—Sughrue, Mion, Zinn, Macpeak and Seas

[57] ABSTRACT

A method and apparatus for separating a cut end (5) from a tubular element (T), such as a cast iron pipe. The element (T) is horizontal and placed on means (1) for supporting and driving it in rotation around its axis (X—X) with axial immobilization. A separator roller (E) is rotatably mounted around an axis (Y—Y) parallel to the axis (X—X) on a yoke (13) supported by a jack (16) enabling the roller to advance towards the axis (X—X) in a radial direction. The roller comprises an annular central wedge (8) bordered by two lateral cylinders (10a, 10b), and penetrates during the cutting operation into a groove (3) made by the cutting tool (2) in the wall of the element (T). At the end of the cutting operation the wedge laterally separates the cut end away from the cutting tool, to thereby avoid damaging the tool.

11 Claims, 7 Drawing Figures

METHOD AND APPARATUS FOR SEPARATING A CUT TUBE END

BACKGROUND OF THE INVENTION

This invention relates to a method and apparatus for separating a cut end from a rigid tubular element, such as a cast iron pipe.

The invention is applied to motor driven pipe cutting machines such as those described in French Patent Application Nos. 82/16,390 and 82/20,733.

In such machines, which are used for cutting large diameter pipes, for example greater than 300 mm, the cutting tools are disposed at a level beneath the diametrical horizontal plane of the pipe to be cut, whereby the severed end could, upon falling, damage the cutting edges of the tools.

SUMMARY OF THE INVENTION

An object of this invention is therefore to provide a method and apparatus for separating and removing the cut end from a tubular element so as to avoid any risk of the cut end falling onto and damaging the cutting tool.

In the method according to the invention, the tubular element is arranged horizontally on support and retaining means allowing its rotation around its longitudinal axis while immobilizing it in axial translation, and its end is sectioned by at least one cutting tool moving towards the axis in a radial direction.

In accordance with the invention, a separating wedge rotatably mounted on an axis parallel to the longitudinal axis of the tubular element is progressively advanced during cutting in a groove made by the cutting tool, said advance or penetration taking place in a plane perpendicular to the axis of the tubular element and in a radial direction approaching said axis. By engaging the wedge in the groove formed in the wall of the tubular element during cutting, the wedge exerts pressure on the end of the tubular element. This pressure implements the removal and separation of the cut end, thus preventing it from falling onto and damaging the cutting tool. Such a method is particularly useful for large diameter pipes whose cut ends can be very heavy.

The apparatus for carrying out this method comprises a separator roller rotatably mounted on a support about an axis parallel to the longitudinal axis of the tubular element to be cut. The support is movable in a radial direction towards the tube axis in a plane perpendicular thereto, said plane being more or less median in relation to the sides of the groove made by the cutting tool and passing through the middle of the cutting edge thereof. The separator roller has a circular wedge profile with an isosceles trapezoid cross-section, i.e. a central cylindrical band bordered by two sloping sides. The wedge is dimensioned to penetrate into the circular groove made in the wall of the tubular element during penetration by the cutting tool, in a radial direction such that its sloping sides exert a camming pressure on the exterior edges of the groove.

The separator roller is mounted with a certain degree of axial play along its axis of rotation. At the end of the cutting operation and due in part to this axial play, the cut end is pushed back by the sloping side of the wedge on which it bears while the opposite sloping side of the roller bears against the axially immobilized section of the pipe. The result is that the cut end cannot fall on the cutting tool.

The present invention differs from that of French Patent Publication No. 2,172,484, which does not describe a cutting machine but rather an on-site manual pipe cutter capable of being used only to cut pipes of relatively small diameters between 50 and 150 mm. Such pipe cutter comprises a series of cutting wheels provided with lateral support cylinders and forming a chain arranged coaxially around the pipe to be cut, and acts both by strangulation and by cutting. It is intended to avoid any wedge effect likely to create an irregular fracture.

DETAILED DESCRIPTION OF THE PREFERRED EMBODIMENTS

Figure 1:
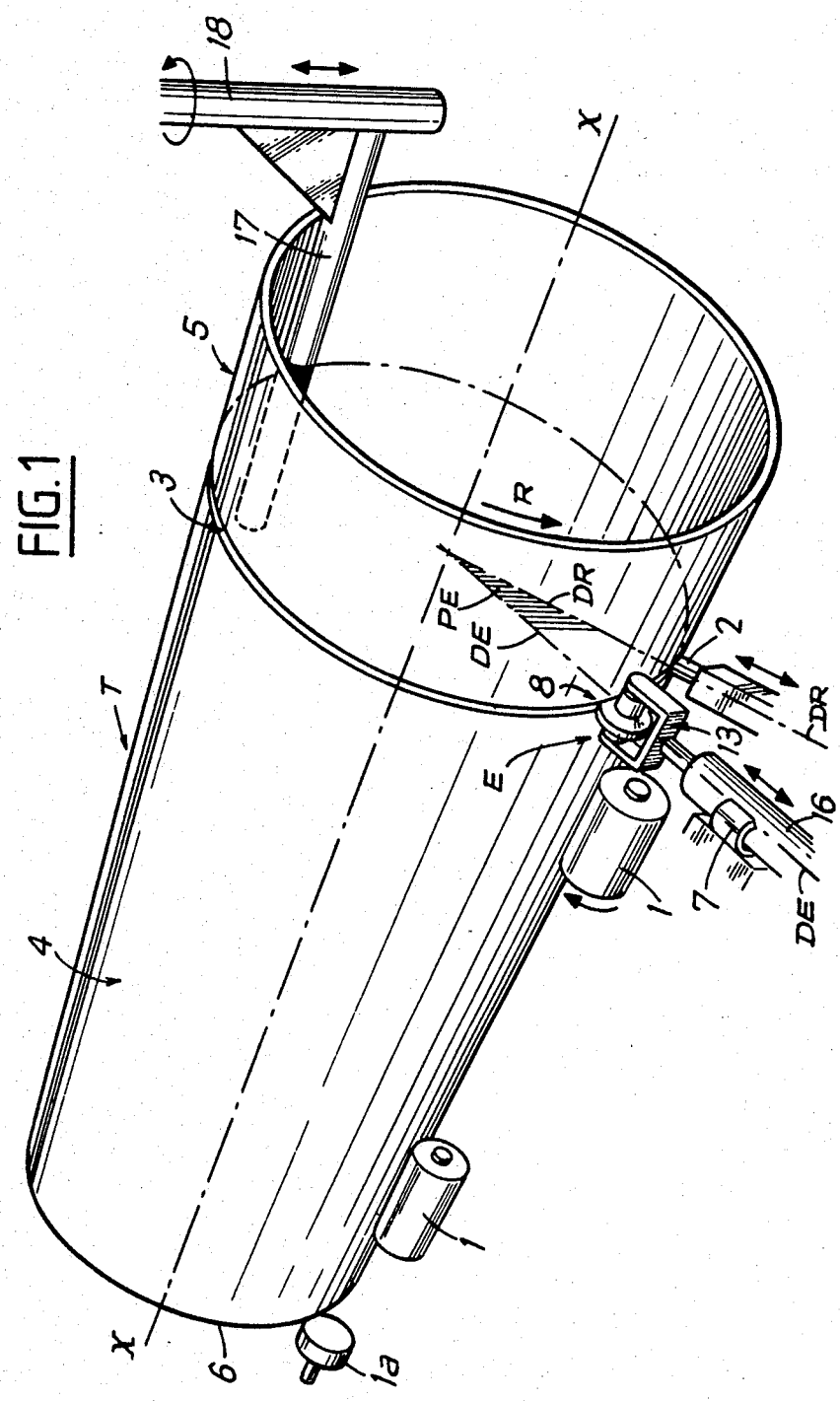
FIG. 1 is a perspective view of a tubular element during cutting and of an apparatus for separating and removing the cut end in accordance with the invention.
Figure 2:
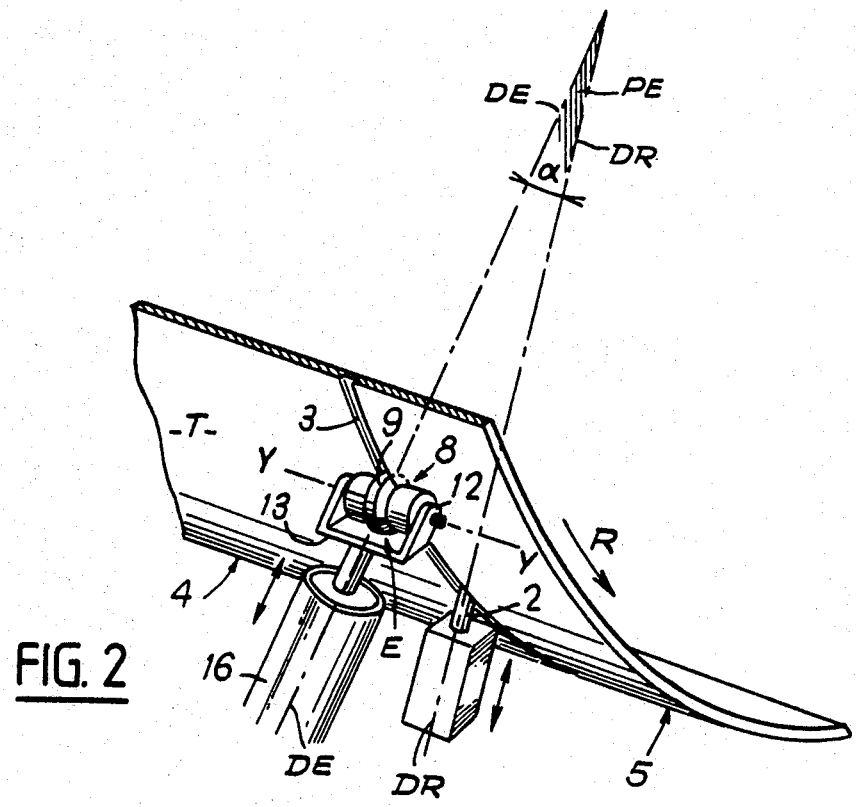
FIG. 2 is an enlarged scale partial perspective view of the separator device of FIG. 1.

FIGS. 1 and 2 show a rigid tubular element or pipe T having a large diameter of at least 300 mm, such as a cast iron pipe, to be cut by a tool 2 in a cutting apparatus, not shown except for the cutting tool or bit and two motorized lateral rollers 1 which support the pipe. Such a cutting apparatus may, for example, be as described in French Patent Application No. 82/16,390 or 82/20,733.

The pipe T is arranged horizontally on means for supporting and rotationally driving it about its axis X—X, such means incorporating the rollers 1 having axes parallel to the axis X—X and retaining means such as an axial stop roller 1a for immobilizing the pipe in axial translation. The stop roller 1a has an axis of rotation parallel to the axis X—X, and is applied against the end of the pipe opposite that to be cut.

The cutting tool 2 is disposed on a radial line DR perpendicular to the axis X—X and can be advanced through the pipe wall in a direction of radial penetration toward the intersection with the axis X—X, in a known manner. During the cutting operation the tool 2 mills a circular groove 3 in the wall of the pipe T. This groove delimits a tubular zone 4 supported by the rollers 1 (as well as by additional rollers, not visible and symmetrical to the rollers 1) and axially immobilized by at least one roller 1a, and a second zone 5 supported out of perpendicular, that is not supported by rollers and constituting the end to be cut.

The apparatus according to the invention for separating and removing the cut zone or end 5 comprises a separator roller E rotatably mounted around an axis Y—Y parallel to the pipe axis X—X on a support 13, 16 radially movable towards the axis X—X in a direction DE and in a plane PE perpendicular to the axis X—X and passing through the middle of the cutting edge of tool 2. The separator roller E is mounted, relative to the direction of rotation of pipe T indicated by the arrow R, ahead or upstream from the cutting tool 2 and slightly above it. In geometric terms, the median sectional plane in relation to the sides of groove 3 includes line Z—Z in FIGS. 4, 5 and 6, which is also the line of the plane PE which bisects the cutting width b.

Figure 3:
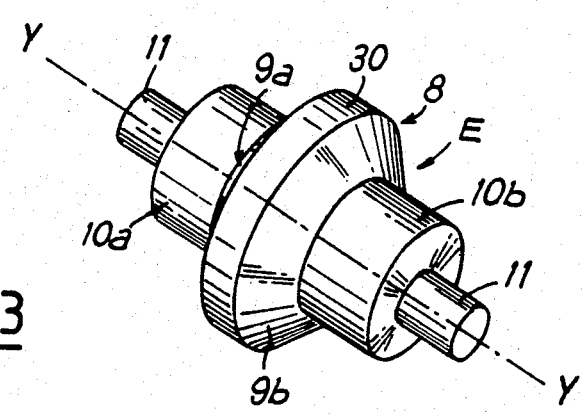
FIG. 3 is a perspective view, on a larger scale than FIG. 2, of the separator roller.
Figure 4:
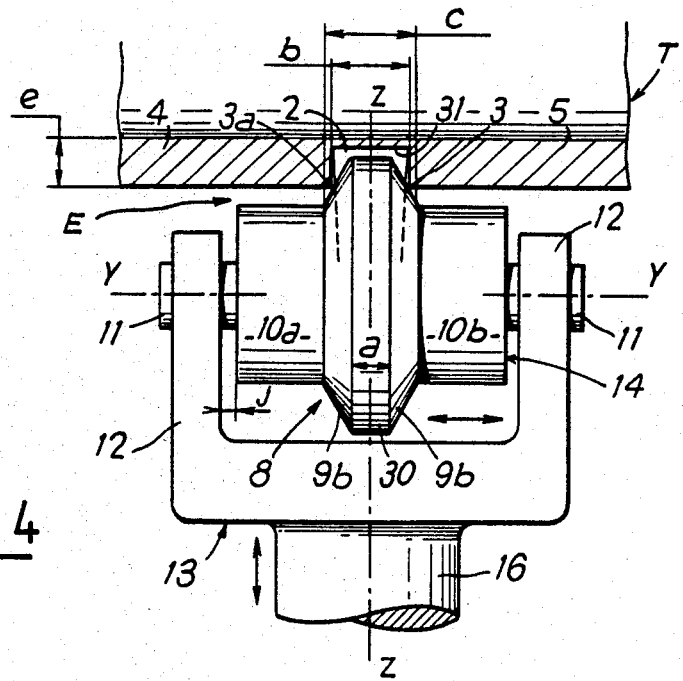
FIG. 4 is an enlarged scale elevation view of the separator roller of FIGS. 1 to 3 and of its support during a cutting operation.
Figure 5:
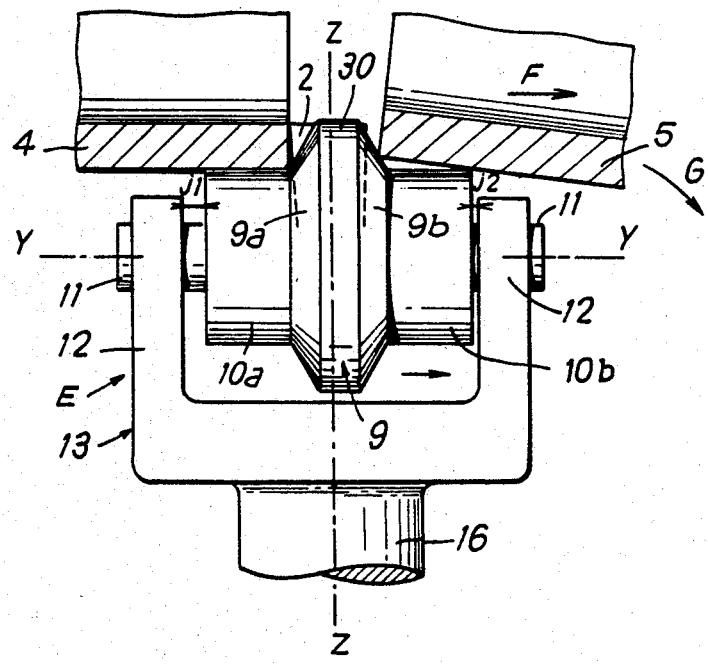
FIG. 5 is a view similar to that of FIG. 4 illustrating the separation phase of the cut end of the tubular element.
Figure 6:
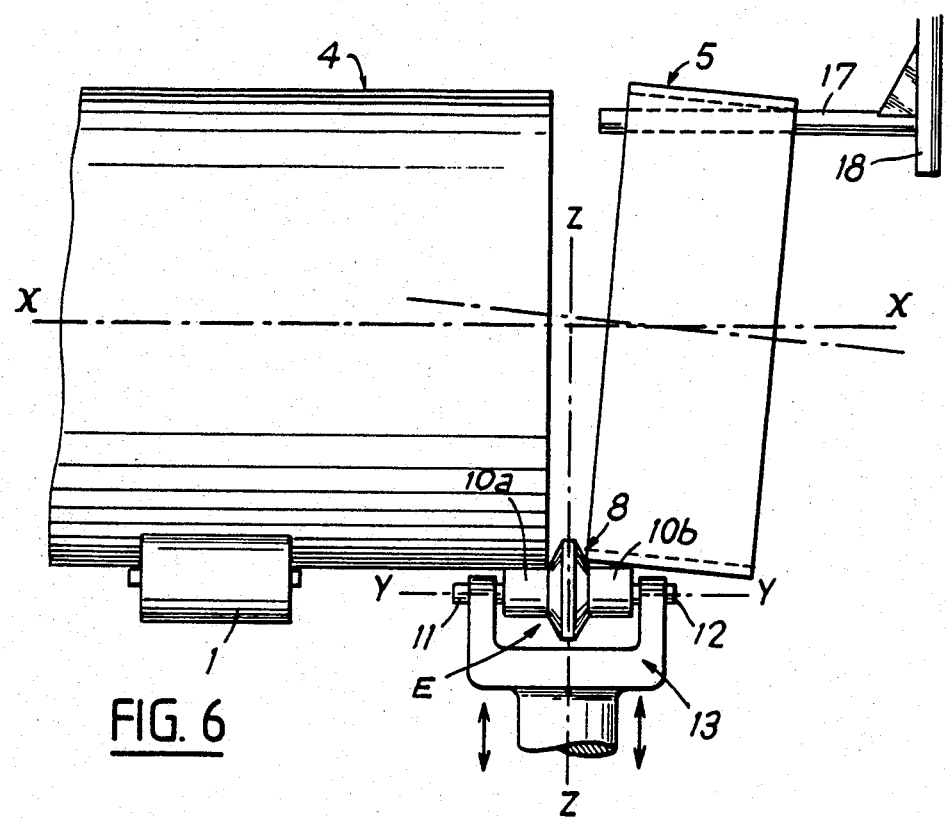
FIG. 6 is a lateral elevation similar to that of FIG. 5 but on a reduced scale, showing the assembly of the tubular element and its cut and separated end as well as a removal means therefor.

The separator roller E is in the shape of a circular wedge 8, as best seen in FIGS. 3 to 5, flanked by two lateral cylindrical elements 10a, 10b connected to the wedge and coaxial therewith, the roller having an axis of revolution Y—Y. The wedge 8 has an isosceles trapezoid cross-section having a cylindrical central band 30 bordered by two sloping truncated sides 9a, 9b. Taking into account the width and depth of the circular groove 3, the central band 30 and the sides 9a, 9b are proportioned to penetrate into the groove during cutting such that the appropriately sloped sides exert pressure on the exterior edges of the groove without band 30 coming into contact with the bottom 31 of the groove, as seen in FIG. 4.

More specifically, the width c of the large base of the isosceles trapezoid defining a cross-section of the circular wedge, is greater than the width b of groove 3, which is equal to the width of the edge of the cutting tool 2 (FIG. 4). Complementarily, the height of the trapezoid is less than the thickness e of pipe T, whereby band 30 cannot effectively come into contact with the bottom 31 of groove 3, even at the end of the cutting operation. The width a of the small base of the trapezoid, that is of band 30, is less than the width b of groove 3.

The lateral cylindrical elements 10a, 10b have equal diameters which are less than that of the central band 30, and at the end of the cutting operation come into contact with the supported tubular zone 4 and its cut end 5. The elements 10a, 10b are each extended by a coaxial pivot 11, freely rotatably mounted in the lateral arms 12 of a yoke 13. The yoke is fixed at the end of the piston of a jack 16 for supporting and maneuvering the separator roller E, for example a pneumatic jack mounted to a fixed support 7 (FIG. 1). The axis of the cylindrical jack body lies on the radial direction of movement DE of the separator roller E. The jack 16 has a lifting power greater than the weight of the end 5 to be cut, but less than the weight of the supported tubular zone 4.

Since pivots 11 are freely rotatable in arms 12, the separator roller E is thus mounted loosely between the arms, and in addition an axial play (j1, j2) is provided between each cylindrical element 10a, 10b and the corresponding arms to enable automatic centering of the separator roller E in the groove 3, and in particular to enable the axial movement of the roller along its axis Y—Y towards the cut end 5 at the end of the cutting operation, as will be explained below.

In accordance with one embodiment, the sum of the axial plays (j1, j2) is slightly less than or at most equal to the width c of the base of the circular wedge 8, that is, of the large base of the isosceles trapezoid defining a transverse cross-section of the wedge, decreased by the width a of band 30. In this manner it is assured that the cylindrical band 30 of the roller is well engaged inside the groove 3. The stem of support jack 16 can move the roller in the radial direction DE (FIGS. 1 and 2) which is the same as line Z—Z (FIGS. 4, 5, 6) of the plane PE perpendicular to axis X—X of the tubular element. Thus, the separator roller E can be moved in the radial direction DE and also in the axial direction along axis Y—Y during cutting, while retaining its axis of revolution Y—Y parallel to the longitudinal axis X—X of element T.

The apparatus also comprises an arm 17 (FIGS. 1 and 6) for supporting and removing of the cut end 5. The arm 17 is arranged horizonally and therefore parallel to axis X—X inside the upper part of the end 5 and is rotatably mounted on a pivot 18 carried by a support which is adjustable in height (not shown), so as to laterally remove the cut end 5 by rotation around the vertical axis of pivot 18.

In operation, the jack 16 and the separator roller E are first arranged such that the radial direction DE is slightly offset by an angle α (FIG. 2) in relation to the radial direction DR of penetration of the cutting tool 2 through the wall of pipe T.

The pipe, taking axial support against roller 1a, is driven in rotation in accordance with arrow R (FIGS. 1-2) by means which are not shown.

At the beginning of the cutting operation, the roller E is positioned such that its radial direction of advancement DE is the same as line Z—Z of the median cutting plane, which passes through the middle of the bottom 31 of the circular groove 3 (FIG. 4), the cylindrical band 30 being supported on the wall of the tubular element T from the start of cutting and rolling.

As soon as tool 2 starts groove 3, jack 16 drives the separator roller E in the direction of the groove, with the axis of revolution Y—Y remaining parallel to axis X—X. As the wedge 8 begins to enter the groove, it is possible that the median plane of the wedge does not coincide with that of the groove. In this case, the two sloping sides 9a, 9b do not simultaneously engage the corresponding exterior edges 3a of groove 3 (FIG. 4). These contacts then take place successively, due to the axial plays j between the cylindrical elements 10a, 10b and the arms 12, which provide for the automatic centering of roller E in relation to groove 3. This automatic centering is also guaranteed by the sum of the plays j being less than the width c decreased by the width a of the cylindrical band 30. At the start of the cutting operation, cylindrical band 30 rolls on the bottom of groove 3. Then, as cutting progresses, sides 9a and 9b take support on the contiguous edges 3a whereas band 30 moves away from bottom 31. At the end of the cutting operation, at the moment of separation of the cut end 5 from the tubular part 4, circular wedge 8 resumes its advance towards axis X—X (FIG. 5) until the cylindrical element 10a engages the wall of the tubular part 4, thus stopping the penetration of the roller E in the groove 3.

Simultaneously, until the roller completes its penetration into the groove, its side 9a slides on edge 3a of the tubular part 4 which is axially immobilized. This forces the roller E and the wedge 8 to slide axially along axis Y—Y, such that the sloping side 9b moves the cut end 5 in the direction of the arrow F of FIG. 5. This is enabled by the axial plays j1, j2. At the end of the cutting operation (FIG. 5) the axial plays are therefore distributed unequally; j1 on the side of part 4 and j2 on the side of the cut end 5, with j2 being considerably less than j1. The end 5 then takes support first tangentially on the cylindrical element 10b, then rocks on the exterior edge of said element as indicated by the arrow G, after having been separated from the tool 2 by the roller E in a direction approximately parallel to axis X—X. The cut end 5 is then received by the support arm 17 which stops its fall, and whose rotation around pivot 18 enables its removal.

After stopping the rotation of pipe T, or a little before stopping, jack 16 is controlled to bring separator roller E back to its starting position in preparation for the next cutting operation.

A main advantage of the separator apparatus of the invention is that it prevents the cut end 5 from falling onto the edge of the cutting tool 2 and damaging it. In any case, the separator roller E breaks the thin metal film at the bottom of groove 3, at the end of cutting, just before the tool 2 completes the groove.

Figure 7:
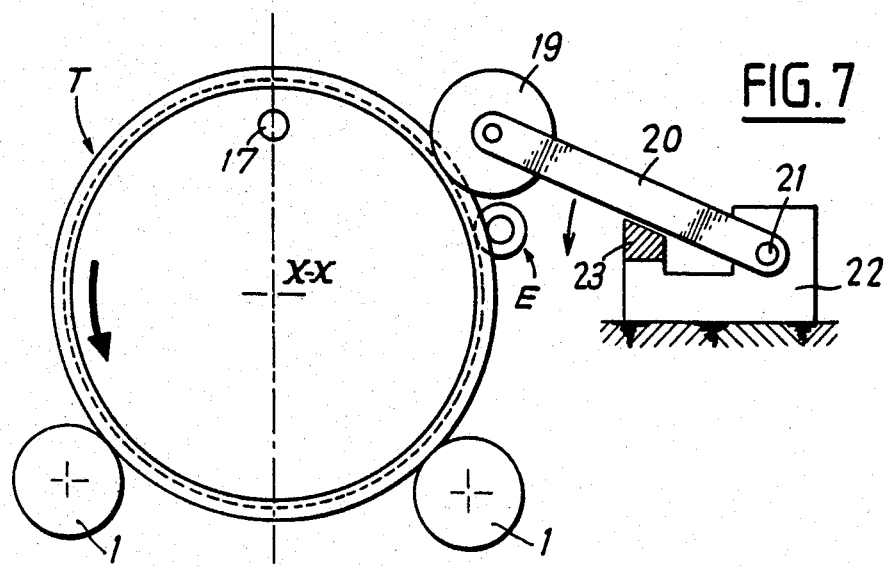
FIG. 7 is a schematic end elevation of a cutting apparatus comprising a cutting tool different from that shown in FIGS. 1, 2, 4 and 5, associated with a separator device in accordance with the invention.

In another embodiment, the cutting tool may comprise a grinding disc 19 (FIG. 7) mounted on a lever 20 which is articulated around a shaft 21 connected to a housing 22. The separator roller E is arranged closely beneath grinding disc 19 and is engaged as in the previous embodiment, in the circular groove made by the disc. In order to prevent the disc, which works by gravity, from falling on the roller E at the end of the cutting operation, an abutment 23 is provided on the housing 22, which restricts the movement of lever 20.

I claim:

1. A method for separating a cut end (5) from a tubular element (T), such as a cast iron pipe, comprising the steps of: horizontally arranging the tubular element on support and retention means enabling its rotation around a longitudinal axis (X—X), immobilizing the element against axial translation, rotationally driving the element, cutting off an end (5) by moving a non-rotatable, material removal cutting tool (2) towards the tubular element axis in a radial direction (DR), and progressively radially advancing a circumferentially spaced separating wedge (E,8) having a profile of an isosceles trapezoid into a generally rectangular groove (3) made by said tool during cutting, said wedge being rotatably mounted around an axis (Y—Y) parallel to the longitudinal axis of the tubular element on a support (16, 13) capable of advancing towards said groove, said advance or penetration taking place in a plane (PE) perpendicular to the axis of said tubular element in a radial direction (DE) of approach towards said axis (X—X), said wedge engaging said groove and exerting axial pressure on the end (5) of the tubular element to be severed, which causes the moving apart and separation of the cut end (5) at the end of the cutting operation to prevent the falling of said end onto the cutting tool.

2. An appartaus for separating a cut end (5) from a tubular element (T), such as a cast iron pipe comprising: a separator roller (E) rotatably mounted around an axis (Y—Y) parallel to a longitudinal axis (X—X) of the tubular element to be cut on a support (16, 13) movable in a radial direction (DE) towards said longitudinal axis in a plane (PE) perpendicular thereto, said plane being median in relation to sides of a circular groove (3) made by a cutting tool (2, 19) and passing through the middle of a cutting edge of the tool, said separator roller comprising a circular wedge (8) with a profile of an isosceles trapezoid in cross-section having a cylindrical central band (30) bordered by two sloping sides (9a, 9b), the wedge profile of said separator roller being proportioned to penetrate into the circular groove formed in the wall of the tubular element during the penetration of the cutting tool, in a radial direction (DR) such that its sloping sides exert lateral separating pressure on exterior edges of the groove.

3. The apparatus of claim 2, wherein the separator roller contains two lateral cylindrical elements (10a, 10b) on opposite sides of the circular wedge, coaxial and integral with said wedge, and whose diameters, both of which are equal, are less than that of the central band of the wedge, said cylindrical elements contacting the tubular element (T) and its cut end (5) at the end of the cutting operation to restrict the movement of the roller in the radial direction.

4. The apparatus of claim 3, wherein the width (c) of a large isosceles trapezoid base forming the circular wedge is greater than the width (b) of the circular groove.

5. The apparatus of claim 4, wherein the cylindrical elements are each extended by a coaxial spindle (11), freely rotatably mounted in lateral arms (12) of a yoke (13) for supporting of the separator roller, an axial play (j) being provided between each cylindrical element and an adjacent yoke arm to enable the automatic centering of the roller in the groove and the axial movement of the roller along its axis (Y—Y) to separate the cut end.

6. The apparatus of claim 5, wherein the sum of the axial plays (j) between the yoke arms and the cylindrical elements is less than the width (c) of the base of the isosceles trapezoid forming the cross-section of the wedge minus the width (a) of the central band of the wedge, to guarantee the penetration of the wedge into the groove at the beginning of cutting.

7. The apparatus of claim 5, wherein the yoke is fixed to the end of a jack (16) supported by a fixed housing (7), the jack axis being coincident with the radial direction (DE) and a median line (Z—Z) passing through the middle of the cutting edge of the cutting tool, such that the separator roller can be moved in the radial direction during cutting while retaining its axis of revolution (Y—Y) parallel to said longitudinal axis (X—X) of the tubular element.

8. The apparatus of claim 2, wherein the radial direction (DE) of advance of the separator roller and the radial direction (DR) of advance of the cutting tool (2, 19) are angularly offset by an angle (α) and lie in the same plane perpendicular to the tubular element axis.

9. The apparatus of claim 2, further comprising an arm (17) for recovering and removing the cut end (5), said arm being arranged parallel to the axis (X—X) of the tubular element and disposed within the end (5) to be cut in the vicinity of its upper portion, said arm being rotatably mounted on a pivot (18) so as to laterally remove the cut end.

10. The apparatus of claim 2, wherein the cutting tool is a milling bit.

11. The apparatus of claim 2, wherein the cutting tool is a grinding disc (19).

* * * * *